(12) United States Patent
Khosravy et al.

(10) Patent No.: US 7,890,646 B2
(45) Date of Patent: Feb. 15, 2011

(54) SYNCHRONIZATION ORCHESTRATION

(75) Inventors: Moe Khosravy, Kirkland, WA (US); Lev Novik, Bellevue, WA (US); Jorg-Thomas Pfenning, Redmond, WA (US); Myron C. Thomas, Newcastle, WA (US); Michael S. Beckerman, Bellevue, WA (US); Vladimir Sadovsky, Bellevue, WA (US); Mark Levy, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 804 days.

(21) Appl. No.: 11/380,582

(22) Filed: Apr. 27, 2006

(65) Prior Publication Data

US 2007/0255854 A1    Nov. 1, 2007

(51) Int. Cl.
*G06F 15/16* (2006.01)
*G06F 7/00* (2006.01)
*G06F 17/00* (2006.01)

(52) U.S. Cl. .................. 709/231; 709/230; 709/232; 709/248; 707/610; 707/611; 707/612; 707/617

(58) Field of Classification Search ......... 709/230–232, 709/248; 707/610–639
See application file for complete search history.

(56) References Cited

U.S. PATENT DOCUMENTS

| | | | |
|---|---|---|---|
| 4,408,273 A | 10/1983 | Plow | |
| 5,255,388 A * | 10/1993 | McLaughlin et al. | 707/204 |
| 5,438,674 A | 8/1995 | Keele | |
| 5,940,862 A | 8/1999 | Erickson | |
| 5,974,238 A | 10/1999 | Chase, Jr. | |
| 6,014,086 A | 1/2000 | Miyashita | |
| 6,247,135 B1 | 6/2001 | Feague | |
| 6,295,541 B1 * | 9/2001 | Bodnar et al. | 1/1 |
| 6,401,104 B1 * | 6/2002 | LaRue et al. | 707/203 |
| 6,442,570 B1 * | 8/2002 | Wu | 707/201 |
| 6,477,543 B1 | 11/2002 | Huang et al. | |
| 6,487,560 B1 | 11/2002 | LaRue | |
| 6,499,039 B1 | 12/2002 | Venkatesh | |
| 6,505,214 B1 * | 1/2003 | Sherman et al. | 1/1 |
| 6,529,944 B1 | 3/2003 | LeCrone | |
| 6,615,246 B2 * | 9/2003 | Pivowar et al. | 709/214 |
| 6,636,873 B1 | 10/2003 | Carini et al. | |
| 6,757,696 B2 * | 6/2004 | Multer et al. | 1/1 |
| 6,856,999 B2 | 2/2005 | Flanagin et al. | |
| 6,883,036 B1 | 4/2005 | Barrett | |

(Continued)

FOREIGN PATENT DOCUMENTS

WO    WO 2005/096176 A1    10/2005

OTHER PUBLICATIONS

Apple Corp. iTunes Homepage. [Retreived online on Dec. 17, 2009] Jan. 7, 2005. [Retreived from the internet] <URL: http://web.archive.org/web/20050107092106/http://www.apple.com/itunes/>.*

(Continued)

*Primary Examiner*—Joseph E Avellino
*Assistant Examiner*—James Baron
(74) *Attorney, Agent, or Firm*—Workman Nydegger (57) ABSTRACT

Systems and methods for orchestrating synchronizations between different targets in a synchronization community. The order and nature of synchronizations may depend on multiple factors, including the initiator of the synchronization, the data being synchronized, and other characteristics of the synchronization participants and synchronization community.

12 Claims, 6 Drawing Sheets

U.S. PATENT DOCUMENTS

| | | | |
|---|---|---|---|
| 6,928,467 | B2 | 8/2005 | Peng |
| 6,944,651 | B2 | 9/2005 | Onyon et al. |
| 7,007,003 | B1 * | 2/2006 | Rybicki .......................... 707/1 |
| 7,050,945 | B2 * | 5/2006 | Oba et al. .................... 702/188 |
| 7,222,141 | B2 | 5/2007 | Zondervan |
| 7,290,019 | B2 | 10/2007 | Bjorner |
| 7,401,103 | B2 | 7/2008 | Novik |
| 7,426,578 | B2 * | 9/2008 | Jones et al. ................. 709/248 |
| 7,440,981 | B2 | 10/2008 | Novik |
| 7,440,985 | B2 | 10/2008 | Novik |
| 7,734,582 | B2 * | 6/2010 | Paul et al. .................... 707/613 |
| 7,792,790 | B2 * | 9/2010 | Kim ........................... 707/609 |
| 2002/0078075 | A1 * | 6/2002 | Colson et al. ............... 707/204 |
| 2002/0133508 | A1 * | 9/2002 | LaRue et al. ................ 707/202 |
| 2002/0194207 | A1 | 12/2002 | Bartlett |
| 2003/0014680 | A1 * | 1/2003 | Zielbauer .................... 713/400 |
| 2003/0125057 | A1 | 7/2003 | Pesola |
| 2003/0130984 | A1 * | 7/2003 | Quinlan et al. ................ 707/1 |
| 2004/0024795 | A1 * | 2/2004 | Hind et al. .................. 707/204 |
| 2004/0136404 | A1 | 7/2004 | Mahonen et al. |
| 2005/0015436 | A1 | 1/2005 | Singh |
| 2005/0027755 | A1 | 2/2005 | Shah et al. |
| 2005/0027817 | A1 | 2/2005 | Novik |
| 2005/0044187 | A1 | 2/2005 | Jhaveri et al. |
| 2005/0076165 | A1 * | 4/2005 | Fujita et al. .................... 710/33 |
| 2005/0086272 | A1 | 4/2005 | Novik et al. |
| 2005/0097225 | A1 | 5/2005 | Glatt et al. |
| 2005/0125430 | A1 | 6/2005 | Souder |
| 2005/0125621 | A1 | 6/2005 | Shah |
| 2005/0198453 | A1 | 9/2005 | Osaki |
| 2005/0203905 | A1 | 9/2005 | Jung et al. |
| 2005/0235015 | A1 | 10/2005 | Abanami et al. |
| 2005/0235019 | A1 | 10/2005 | Yang |
| 2005/0258806 | A1 * | 11/2005 | Janik et al. .................. 320/155 |
| 2005/0262371 | A1 * | 11/2005 | Luke et al. .................. 713/400 |
| 2006/0002681 | A1 * | 1/2006 | Spilo et al. .................... 386/46 |
| 2006/0041611 | A1 * | 2/2006 | Fujita et al. ................. 709/200 |
| 2006/0080354 | A1 * | 4/2006 | Berger et al. ............ 707/103 R |
| 2006/0106881 | A1 * | 5/2006 | Leung et al. ................ 707/200 |
| 2006/0184589 | A1 | 8/2006 | Lees |
| 2006/0215569 | A1 | 9/2006 | Khosravy |
| 2007/0100834 | A1 * | 5/2007 | Landry et al. ................. 707/10 |
| 2007/0274231 | A1 * | 11/2007 | Marks et al. ................ 370/254 |
| 2008/0288578 | A1 * | 11/2008 | Silfverberg ................. 709/203 |
| 2010/0211542 | A1 * | 8/2010 | Starbuck .................... 707/610 |

OTHER PUBLICATIONS

Maria Butrico et al., "Enterprise Data Access from Mobile Computers: An End-to-end Story", Proceedings of the Tenth International Workshop on Research Issues on Data Engineering: Middleware for Mobile Business Applications and E-Commerce, Feb. 27-28, 2000, San Diego, California, USA. IEEE Computer Society, 2000.

Mario J. Silva et al., "Designing Information Appliances using a Resource Replication Model", Proceedings of International Symposium on Handheld and Ubiquitous Computing, HUC\'99, Sep. 1999.

Intellisync for Palm, Pocket PC and Windows CE, retrieved on Dec. 1, 2005 from http://www.tigerdirect.com/applications/SearchTools/item-details.asp?EdpNo=1116577&CatId=303.

Uwe Hansmann et al., "SyncML Applications", article from the book "SyncML: Synchronizing and Managing Your Mobile Data", 2003.

Byung-Yun Lee, et al., Data Synchronization Protocol in Mobile Computing Environment Using SyncML, 5th IEEE International Conference on High Speed Networks and Multimedia Communication, 2002, pp. 133-137.

M. Adaka, et al., A Dynamic Synchronization Protocol and Scheduling Method Based on Timestamp Ordering for Real-Time Transactions, Institute of Electronics Information and Communication Engineering, Apr. 1999, vol. J82D-I, No. 4, pp. 560-570.

A. Fukii et al., A Fast Sequential Distributed Synchronization Protocol, Systems and Computers of Japan, Nov. 15, 1998, vol. 29, No. 12, pp. 11-18.

C. Mourlas, et al., Task Synchronization for Distributed Real-Time Applications, IEEE Computer Social, 1999, pp. 184-190.

J. Parrow et al., Designing a Multiway Synchronization Protocol, computer Communications, Dec. 1996, vol. 19, No. 14, pp. 1151-1160.

S. Chrobot et al., Common Primitives for Synchornisation Protocols, Kuwait Journal of Science & Engineering, 1996, pp. 97-111.

R. Rajkumar, Real-Time Synchronization Protocols for Shared Memory Multiprocessors, IEEE Computer Social Press, 1990, pp. 116-123.

S. Jajodia et al., Transaction Processing in Multilevel-Secure Databases Using Replicated Architecture, IEEE Computer Social Press, 1990, pp. 360-368.

E. Rahm, A reliable and Efficient Synchronization Protocol for Database Sharing Systems, Fault-Tolerant Computer Systems 3rd Interantional CI/ITG/GMA Conference Proceedings, 1987, pp. 336-347.

S. Miranda, A Formal Specification Framework for Synchronization Protocols in Distributed Data Bases, Distributed Data Sharing Systems Proceedings of the Second International Seminar, Netherlands, 1982, pp. 45-54.

Office Action dated Jul. 11, 2007 cited in U.S. Appl. No. 10/631,591.

Office Action dated Nov. 28, 2007 cited in U.S. Appl. No. 10/631,591.

Notice of Allowance dated Jul. 29, 2008 cited in U.S. Appl. No. 10/631,591.

Office Action dated Nov. 14, 2006 cited in U.S. Appl. No. 10/631,212.

Office Action dated May 1, 2007 cited in U.S. Appl. No. 10/631,212.

Notice of Allowance dated Jul. 25, 2007 cited in U.S. Appl. No. 10/631,212.

Notice of Allowance dated Dec. 10, 2007 cited in U.S. Appl. No. 10/631,212.

* cited by examiner

STATIC TOPICS 310

| ID | NAME | DEFINITION |
|---|---|---|
| ID 1 | "ALL DOCUMENTS" | PATH="/MY DOCUMENTS" |
| ID 2 | "ALL MUSIC" | PATH="/MY MUSIC" |
| ID 3 | "ALL CONTACTS" | <INHERENT> |
| ... | | |

FIG. 3A

DYNAMIC TOPICS 350

| ID | NAME | DEFINITION |
|---|---|---|
| ID 10 | "RECENT MUSIC" | PATH="/MY MUSIC" AND LASTPLAYDATE<TODAY-7 DAYS |
| ID 11 | "MY TOPIC" | MYPROPERTY="SOMEVALUE" |
| ... | | |

SYNCHRONIZATION ORCHESTRATION

CROSS-REFERENCE TO RELATED APPLICATIONS

This specification is related to U.S. patent application Ser. Nos. 11/354,677 filed Feb. 15, 2006 and 11/380,579 filed Apr. 27, 2006.

BACKGROUND

The synchronization of data between two devices—such as between a personal digital assistant (PDA) and a desktop computer—may be relatively common today. However, with every year that has passed, the number of computing devices and services commonly used has grown, and synchronization schemes that offer additional functionality—like "multi-master" synchronization where many different entities can modify the same synchronized data—have become more common. With these advances, the need to synchronize data between more than just two devices is becoming more widespread.

In a "synchronization community" comprised of a variety of different "synchronization participants," such as computing devices, services, applications, and so on, some or all of the synchronization participants may modify and synchronize data. A variety of schemes may be used to synchronize this data. Such schemes may operate in "pair-wise" fashion, where synchronization participants synchronize, possibly in turn, with other synchronization participants. Other environments may use other types of synchronization, where, for example, a particular synchronization operation may occur between more than just two participants.

Regardless of how the synchronization of data is performed, the question of how such synchronization operations between individual members are organized or orchestrated may affect the efficiency and usability of the synchronization participants in the synchronization community. For example, some systems for orchestrating synchronizations of multiple devices require that all devices in the synchronization community be synchronized before any particular device can be disconnected and removed. Such a requirement, for example, may make it particularly hard for a user of a portable device like a mobile phone or media player to quickly synchronize the data in which they are interested. Various other problems may also exist when orchestrating synchronization operations between multiple devices.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various technologies and techniques directed to the orchestration of synchronization operations between different participants in a synchronization community. The orchestration of synchronization operations between different participants may use one or more pieces of data associated with the synchronization participants and the greater synchronization community to organize the synchronization operations in such a way so as to fulfill or match the intent or needs of particular elements or users of the synchronization community. Using this data, the orchestration systems and methods may determine, for example, which participants to synchronize, the order in which to synchronize different participants, and when synchronization of particular participants may be considered "complete," so that, for example, a device may be disconnected from the synchronization community.

DETAILED DESCRIPTION

The present invention extends to various technologies and techniques directed to the orchestration of synchronizations between synchronization participants. More particularly, described herein are, among other things, systems, methods, and data structures that facilitate the orchestration of synchronizations between members of a synchronization community.

As described herein, synchronization is the transfer of particular pieces of data between synchronization participants, which may be, for example, computing devices, services accessible through a variety of communication links, applications running on computing devices, and so on. In some cases, synchronization may also be referred to as replication. Synchronization operations, or the synchronizations between multiple devices, may be considered to occur between synchronization participants. For example, a synchronization ("sync") or synchronization operation might occur between two computing devices, between a computing device and a service (that in turn runs on another computing device or on the same computing device), between applications on the same or different computing devices, and so on. In a synchronization operation, particular pieces of data may be transferred between the involved sync participants.

Synchronization participants may be coupled or connected in any of a variety of fashions or topologies, as allowed or defined by the methods in which synchronization is implemented. For example, in some implementations, some synchronization participants may be connected using wired links, like a Universal Serial Bus (USB) link or some form of wired networking link, like an Ethernet connection. In the same or other implementations some synchronization participants might be connected wirelessly. In the same or yet other implementations, some synchronization participants might reside on the same computing device and communicate, for example, through inter-process procedure calls of some kind. Regardless of the means by which synchronization participants are connected, the topology of the synchronization community may vary widely. For example, some synchronization participants might be connected in a "hub and spoke" fashion while others are connected using communication "bus," and so on.

The synchronization of data may be implemented in a variety of ways and, in some cases, be implemented independently of the orchestration techniques describe herein. For example, one method of implementing the synchronization of data might simply consist of copying a file between synchronization participants. The same or other methods of synchronization might require that changes only occur on particular entities, while different methods of synchronization might provide "multi-master" capability, where more than one synchronization participant may make changes to shared and synchronized data, without a single master replica or sync participant. One such implementation of a multi-master synchronization scheme is described in U.S. patent application Ser. No. 10/631,591, titled "Systems and Methods for Replicating Data Stores."

In some cases, one or more of the synchronization participants in a synchronization operation may be referred to as a synchronizing entity, while other participants may be referred to as synchronization targets or sync targets. As described herein, a synchronizing entity may be the participant which is "driving" or performing a synchronization operation, while a sync target may be the participant that is responding to synchronization requests or communication from the synchronizing entity. It's important to note that in many embodiments, a particular sync participant may be a sync target in some synchronization operations and a synchronizing entity in other synchronization operations. Furthermore, depending on how the synchronization of data is implemented, the participants in a sync operation may drive parts of the synchronization of data and therefore more than just one participant may warrant being called a synchronizing entity. Finally, while the descriptions herein may use the terms synchronizing entity and sync target, the orchestration of sync operations is often independent of such designations.

Given some number of synchronization operations to complete between different members of a synchronization community, the methods and systems described herein may be used to more efficiently organize such synchronizations. Multiple sync operations between the same or different sync participants may be part of a "sync procedure." As described herein, a sync procedure may comprise the orchestration and execution of multiple sync operations. This orchestration may use a variety of information associated with the sync participants and the sync community to determine, for example, which participants should be synchronized and the order in which such participants should be synchronized.

The information used to orchestrate synchronizations can vary greatly. In some cases the information used may be determined from the sync community as a whole, from a single sync participant, and/or from multiple sync participants. In some cases, at least part of the information used to orchestrate the synchronization procedure may be determined using, for example, characteristics of the sync participant that initiates the sync procedure. In the context of such a sync procedure, that participant may be referred to as the "sync initiator."

As just one of many possible examples, and without limitation, suppose a PDA that holds contact and calendar information, but cannot play music, is connected by a user to a desktop computer using, say, a USB cable. Also suppose that the desktop computer contains contact and calendar information and a link to a service on the Internet that provides music. In such an implementation, it may be appropriate for the sync procedure to be orchestrated so that contact and calendar information is synchronized between the PDA and the desktop computer while the music service is ignored—and no music is synchronized—because the PDA of this example does not have the ability to play music.

In another example, and again without limitation, suppose a music player is attached to the same desktop PC. In this case, the orchestration of the sync procedure may be such that the media player is synchronized first with a local copy of music (originally obtained from the Internet music service) that exists on the desktop PC. Such a synchronization operation may complete relatively quickly because local copies of digital music files can often be transferred relatively quickly over a USB connection, especially when compared to the transfer of digital music files from a remote service. In this example, because the desktop PC does not first synchronize with the music service, the music initially synchronized with the media player may not be as up to date as possible, and may, for example, not include particular music available from the music service. However, rather than waiting for a full synchronization between the desktop PC and the music service, which may take a long time, the user may prefer to have somewhat out-of-date data so that they can leave with the media player more quickly.

Figure 1:
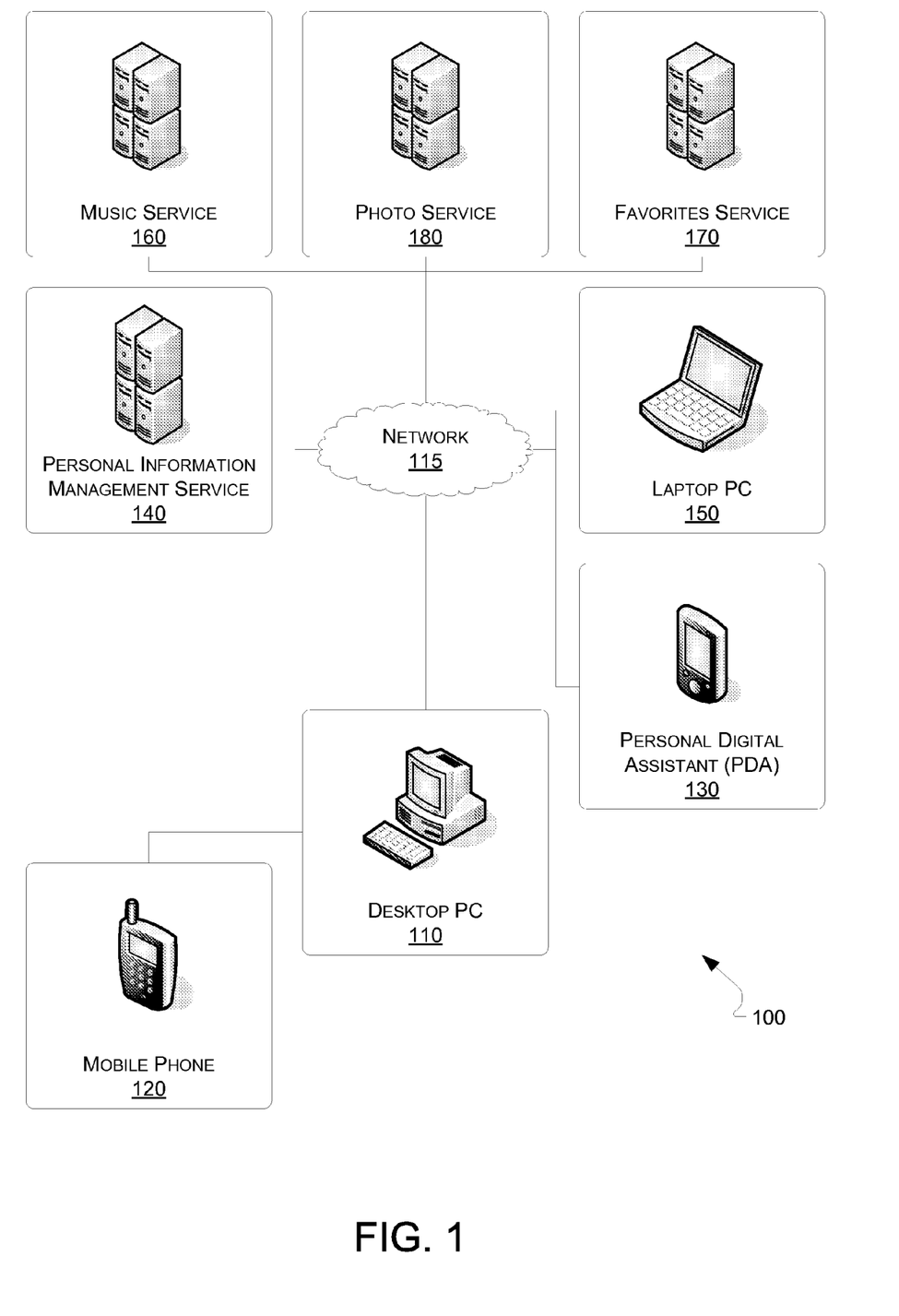
FIG. 1 illustrates an exemplary synchronization community.

Turning now to FIG. 1, shown therein is an exemplary synchronization community 100. Included in the community are a variety of sync participants, including a desktop PC 110; a mobile phone 120; a PDA 130; a personal information management service 140 that might store contacts, calendar, and other information; a laptop PC 150, a music service 160, a favorites service 170 that might store items like Internet bookmarks for favorite sites; and a photo service 180 that might store digital photographs. All of the sync participants but the mobile phone 120 are connected in this example by a network 115. Such a network may be comprised of any kind of network or networks, including private networks such as those available at some workplaces or residences, and public networks like the Internet. The mobile phone 120 is connected to the desktop PC 110 in this example by some other type of link—perhaps by a wired connection like that provided by a USB cable, or via a wireless connection like that provided by Bluetooth. The mobile phone 120, as well as the other sync participants, may connect to the sync community at various times using additional different types of communication links. For example, when the user of the mobile phone 120 is away from his or her desktop PC, the phone may connect—perhaps directly to the network 115—using a data network accessible through his phone, including networks that use such GPRS, EDGE, HSDPA, and EV-DO, or the like. It is important to note that the sync community 100 is provided as just one example of a sync community. Other sync communities may include many fewer or many more sync participants connected in a variety of fashions and topologies. Furthermore, although not shown in this figure, in some sync communities, multiple computing devices may house more than one sync participant. For example, a server computer might itself contain multiple services, each of which is considered a sync participant.

Each of the sync participants may have different purposes, store various and in some cases different types of information, and may synchronize this information in one or two directions. For example, the purposes of the mobile phone 120 may be to make and receive telephone calls, to store contact and calendar information, and to take photographs. Such a mobile phone may store contacts and calendar information, as well as photographs, and may synchronize changes made on the phone with one or more of the desktop PC 110, the personal information management service 140, and the photo service 180. Depending on how the mobile phone is connected, it may synchronize directly and perhaps only with, say, the desktop PC 110. In other implementations or when connected differently, the mobile phone may synchronize directly with both the personal information management service 140 and the desktop PC 110, or solely with the personal information management service 140, or in some other configuration. When information can be changed on the phone and on another synchronizing entity, like the desktop PC 110, synchronizations between the phone and, for example, the desktop PC may be "two-way" in that changes are transmitted both to and from, say, the mobile phone. In some implementations, the mobile phone 120 may be a read-only device with respect to calendar and contact information, and may only update this information when the information has been changed on another sync participant, like perhaps the desktop PC 110. In such a case, data may only ever flow from the desktop PC 110 to the mobile phone 120. In the same or other implementations, two-way synchronization may be implemented as two separate one-way synchronization operations, while in other implementations both the "to" and "from" iterations may be included in the same logical synchronization operation.

Some sync participants may store all of the data transmitted by members of the synchronization community, while other participants may only store portions of such data. For example, the photo service 180 may accept and store photographs, but not store calendar, contact, music, or other data. In contrast, the desktop PC 110 may store calendar, contact, music, photos, favorites, and so on. The laptop PC 150, perhaps because of limited hard drive space—at least with respect to the desktop PC 110—might store the same types of information as the desktop PC, but only store subsets of such data. It might, for example, store only the music rated with "five stars," or some other subset of the data.

Again, it is important to note that all of these sync participants, the manner in which they are connected, the data they store, and so on, are provided as examples—a sync community may include additional sync participants or fewer sync participants, may include different types of devices or sync participants connected in different ways, and so on. Similarly, the data stored or synchronized by these participants may differ.

Figure 2:
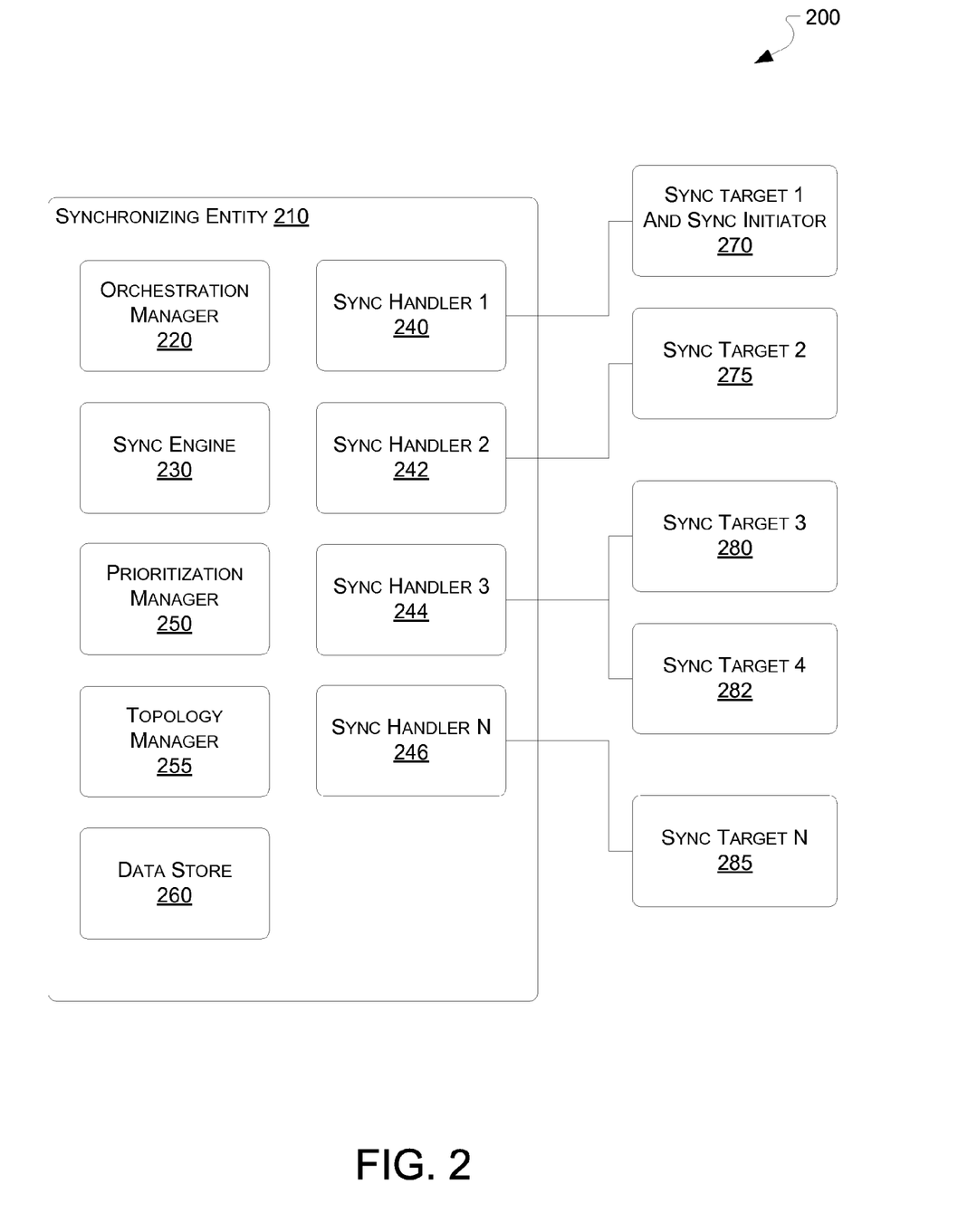
FIG. 2 illustrates one embodiment of a system in which synchronization orchestration might occur.

Turning now to FIG. 2, shown therein is one embodiment of a system 200 in which synchronization orchestration might occur. Included in the exemplary system are a synchronizing entity 210 that includes an orchestration manager 220, a sync engine 230, a prioritization manager 250, a topology manager 255, a data store 260, and four sync handlers 240, 242, 244, and 246. Also in the exemplary system are five sync targets 270, 275, 280, 282, and 285. This description of FIG. 2 is made with reference to FIG. 1, FIG. 3, FIG. 4, and FIG. 5. However, it should be understood that system described with respect to FIG. 2 is not intended to be limited to be used with the elements illustrated by FIG. 1, FIG. 3, FIG. 4, and FIG. 5.

The synchronizing entity 210 contains various modules and components, discussed below, that perform a variety of tasks related to orchestration and synchronization. The synchronizing entity might be a part of a computing device, like those described previously with respect to FIG. 1. For example, the desktop PC 110, the photo service 180, or any of a number of other devices might incorporate or act as a synchronizing entity. As described previously, a synchronizing entity may be the participant which is "driving" or performing the synchronization operation, while a sync target may be the participant that is responding to synchronization requests or communication from the synchronizing entity.

The orchestration manager 220 orchestrates the synchronization operations performed by the sync engine 230. It uses input data to, among other things, identify the targets with which the sync engine should synchronize and to order the synchronization operations. In some implementations, the orchestration manager performs operations explained in more detail below with respect to the discussion of FIG. 4 and FIG. 5.

The sync engine 230 is responsible for synchronizing all or subsets of the data stored in the data store 260 with sync targets identified by the orchestration manager 220. As explained previously, the sync engine may use a number of different methods to perform the actual synchronization of data—that is, to transfer data to a sync target, from a sync target, or both to and from a sync target. The operations of the orchestration manager may be independent of the method or methods used to transfer data.

The sync target or sync targets with which the sync engine 230 interacts may be implemented in many different types of devices, applications, or services; in many different locations; store different types of data; and so on. To abstract or hide the differences in sync targets from the sync engine and avoid the need to make the sync engine itself aware of all of these, and any other, differences, the sync engine may interact with sync targets through one or more sync handlers, like sync handler 1 240, sync handler 2 242, sync handler 3 244, and sync handler N 246.

As an example, suppose that the sync entity is implemented in a device like a desktop PC 110 of FIG. 1 and that sync target 1 270 is implemented in a device like a mobile phone 120. Also suppose that, at least at a particular point in time, the mobile phone (sync target) is connected to the desktop PC (sync entity) using a USB connection. In this case, the sync entity might interact with the mobile phone using a sync handler that understands the USB protocol. In contrast, consider another sync target like a photo service 180, also of FIG. 1. In this case, the sync entity/desktop PC might interact with the photo service using a handler that understands a web-based photo-sharing API, perhaps like that provided by the Flickr service operated by Yahoo! Inc. In both examples, the sync handler abstracts the details of communication between the sync engine and the sync target.

Sync handlers may interact with one or more sync targets. As shown in the example illustrated in FIG. 2, sync handler 1 240 interacts with sync target 1 270, sync handler 2 242 interacts with sync target 2 275, and sync handler N 246 interacts with sync target N 285. In each of these examples, the sync handler interacts with a single sync target. Also as illustrated in FIG. 2, sync handler 3 244 interacts with two sync targets, sync target 3 280 and sync target 4 282. This may happen in a number of situations. For example, a sync handler that understands how to interact with sync targets that implement particular APIs or protocols—like USB or the Flickr photo-sharing API—may interact with multiple instances of participants that implement or communicate using the particular APIs or protocols. In other implementations, a sync handler may interact with only a single sync target, even when multiple sync targets implement and communicate through the same APIs or protocols.

As introduced previously, in some cases at least part of the information used to orchestrate the sync procedure may be determined using, for example, characteristics of the sync initiator, which is sync participant that initiates the sync procedure. Suppose, for the sake of example, that the sync target 270 is also the sync initiator. For example, the sync target 270 might be a device like a mobile phone 120 or a PDA 130, both of FIG. 1, that has just been connected to a device like a desktop PC 110, to initiate a synchronization between the device and the desktop PC. As a result, and as discussed in more detail below with reference to FIG. 4 and FIG. 5, the orchestration manager 220 of the desktop PC 110, might orchestrate a synchronization procedure comprised of multiple sync operations between the synchronizing entity—the desktop PC 110 in this case—and different sync targets, including the mobile phone 120 or PDA 130 that is the sync initiator.

It should be noted that the sync target 1 270, sync target 2 275, sync target 3 280, sync target 4 282, and sync target N 285 are provided as part of the example system illustrated in FIG. 2 and do not limit the description herein to any particular number or arrangement of sync initiators or sync targets. For example, some systems may have more or fewer sync initiators and sync targets. In other, or the same, systems, the synchronizing entity 210 may have more or fewer sync handlers. In further other or the same systems, the sync initiators and sync targets may be linked to more or fewer sync handlers. For example, in one system a single sync handler may be coupled with all sync targets while in other systems each sync handler may be linked to a single sync target.

The prioritization manager 250 manages the data stored in the data store 260 so that, in some instances, data that is defined as "more important" is stored in lieu of data defined as "less important." That is, the prioritization manager 260 prioritizes the storage of data. For example, a particular sync participant—perhaps like a multi-function mobile phone—may have the ability to store contacts, calendar, and email data, and may also be able to store and play back music and videos. The user, or the device itself through defaults, for example, may specify that contact, calendar, and email data is "more important" than music and video data. It may also specify that music data is "more important" than video data, perhaps simply because video data may tend to require more storage than music data. In such a case, the prioritization manager might decide to delete video data if necessary to make room for newly synchronized contact, calendar, email, or even music data. Any such organization of any type of data may be contemplated and supported by the prioritization manager 250. In addition, the manner in which the prioritization manager determines more and less important data may be controlled in a variety of ways using explicit or implicit instructions and defaults. In some implementations, for example, the synchronizing entity or prioritization manager might define default prioritizations for different types of data, and also enable the user to customize these rules and so control the priorities of data synchronized with the device.

The topology manager 255 provides information about the topology of the sync community. For example, it might provide information about how sync participants are connected to each other and which sync participants are connected to which other sync participants. In some cases and in some implementations, this information may be used when orchestrating a synchronization procedure. For example, using information from the topology manager, a sync procedure might be orchestrated in such a way so as to reduce the number of the sync operations or bandwidth necessary to transfer a particular item—perhaps by identifying the smallest number of network "hops" required to connect particular sync participants.

The data store 260 stores data synchronized with the device. For example, the data store might store contacts and calendar information on a PDA-type device, might contain music or video data on a media player device, and so on. Devices that support multiple functions might store a wide variety of data—the exemplary multi-function phone mentioned above in the discussion of the prioritization manager 250 might store calendars, contacts, email, music, and video. In addition, the data store 260 might store other data, for example, that is perhaps used to implement efficient synchronization, such as version information, knowledge of the changes previously synchronized, and so on. The data store 260 might also store information about the specific information to synchronize. This information might be represented using topics, as discussed below with reference to FIG. 3.

It should be understood that while the synchronizing entity 210 contains various modules, in one or more alternative implementations, a single module may perform more than one of the tasks associated with the modules in the synchronizing entity 210. For example and without limitation, in some implementations, the operations of the orchestration manager 220 and the sync engine 230 might be implemented in the same module. Also, in one or more alternative implementations, the modules may perform additional tasks not shown or discussed. Furthermore, in one or more alternative implementations, the modules may reside on more than one device or computer system. For example, and without limitation, the data store might be implemented on a storage device—like one or more hard disks—connected to the computing device using a local connection, like an IDE or SCSI connection. The data store 260 might also be implemented using a storage device—again perhaps one or more hard disks—that exists on a remote computer, perhaps using a local area network or some other networking technology. As another example, particular modules that provide functionality—like the orchestration manager 220 or sync engine 230—might be implemented on one or more remote computing devices, perhaps connected via some type of remote procedure call (RPC) or other communication mechanism. When more than one device is involved, the communication between the devices may be accomplished using a variety of methods, including by using a wireless connection of some kind, by using a wired connection, or by any other communication mechanism with which computing devices may communicate. In addition, not all of the modules may be implemented in all synchronizing entities. For example, a synchronizing entity that does not enable the prioritization of different types of data might not require the inclusion of a prioritization manager 250.

Figure 3A:
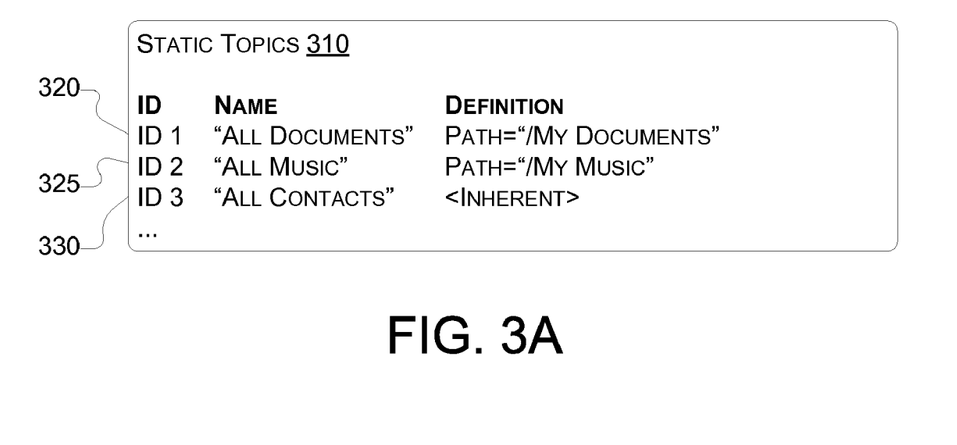
FIG. 3 illustrates some manners in which data to be synchronized may be identified.
Figure 3B:
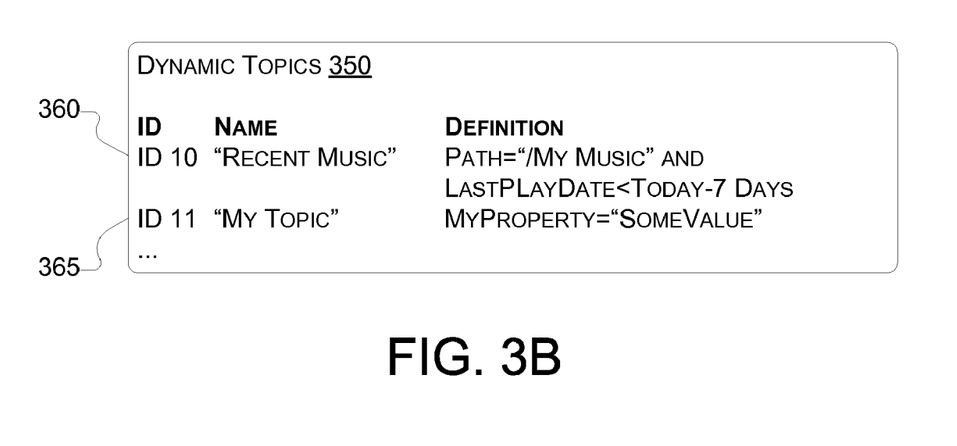

Turning now to FIG. 3A and FIG. 3B, shown therein are some manners in which data to be synchronized may be identified. In some environments it may be beneficial to enable the synchronization of different amounts or types of data, which may require a means for identifying the particular sets of data to be synchronized.

The representations of FIG. 3A and FIG. 3B illustrate the concept of a "topic," which identifies a set of data to be synchronized. A topic may be comprised of an identifier, a name, and a definition that specifies the data associated with the topic, among other things.

FIG. 3A illustrates an exemplary list of "static" topics 310. The list is comprised of three example static topics: static topic 320, static topic 325, and static topic 330, and may contain any number of static topics. As described herein, a "static topic" is a data construct that identifies a particular set of data. A static topic may be "static" in multiple contexts. A static topic may be defined once and may not change, or at least may not change except in very infrequent cases. For example, the exemplary static topic 320 with ID 1 may always refer to "All Documents." Static topics may also be defined in terms of schema—or metadata—that is pre-defined and does not change, or at least changes infrequently. For example, the same exemplary static topic with ID 1 is defined to include all documents that include the path "My Documents". In addition, in some implementations it may be assumed that all of the sync participants in a sync community understand both the list of static topics and the schemas used to define the static topics. For example, all sync participants might understand that topic ID 1 refers to all documents, and that the path used by the topic is "/My Documents".

The list of static topics 310 also includes exemplary static topic 325 with ID 2 and name "All Music" that represents all music, and exemplary static topic 330 with ID 3 and name "All Contacts" that represents all contact information. In this diagram, the text "<Inherent>" means that the particular sync participant may store contact information in a variety of ways, but still understand the concept of "all contacts." It is important to note again that the topics of FIG. 3A and FIG. 3B are exemplary topics and that a topic may identify any type or set of information to synchronize and may use any kind of identification or criteria to perform such identification.

In contrast to static topics, sync participants in a sync community might have the ability to add or use a topic that changes dynamically. Such topics may be referred to as "dynamic topics." The metadata or schema used to define a dynamic topic may be itself added or changed and does not necessarily need to be pre-defined or understood by all sync participants. A list of exemplary dynamic topics 350 is provided in FIG. 3B. For example, the dynamic topic 360 with ID 10 and name "Recent Music" might be added by a user, application, or other entity, and might represent all music played in the last seven days. In this example, the dynamic topic 360 might not have been defined as a static topic when the sync targets or sync community was first created, and so a user or application might have added it later. Also as an example, the dynamic topic 365 with ID 11 and name "My Topic," might have been added by a user or some other entity. In contrast to the "Recent Music" dynamic topic 360, which might be defined in terms of, in this example, pre-defined schema elements "Path" and "LastPlayDate," the dynamic topic 365 named "My Topic" might be defined in terms of a schema element named "My Property". This schema element might itself have been added and might not be understood by all sync participants.

It may be possible for dynamic topics to be created that identify the same set of information as pre-existing static topics. For example, it might be possible to define a dynamic topic named "Another set of All Documents" with associated criteria that the documents exist in the path "/My Documents". Stated differently, the resulting set of data identified by a static or dynamic topic does not necessarily distinguish between the two types of topics.

Figure 4:
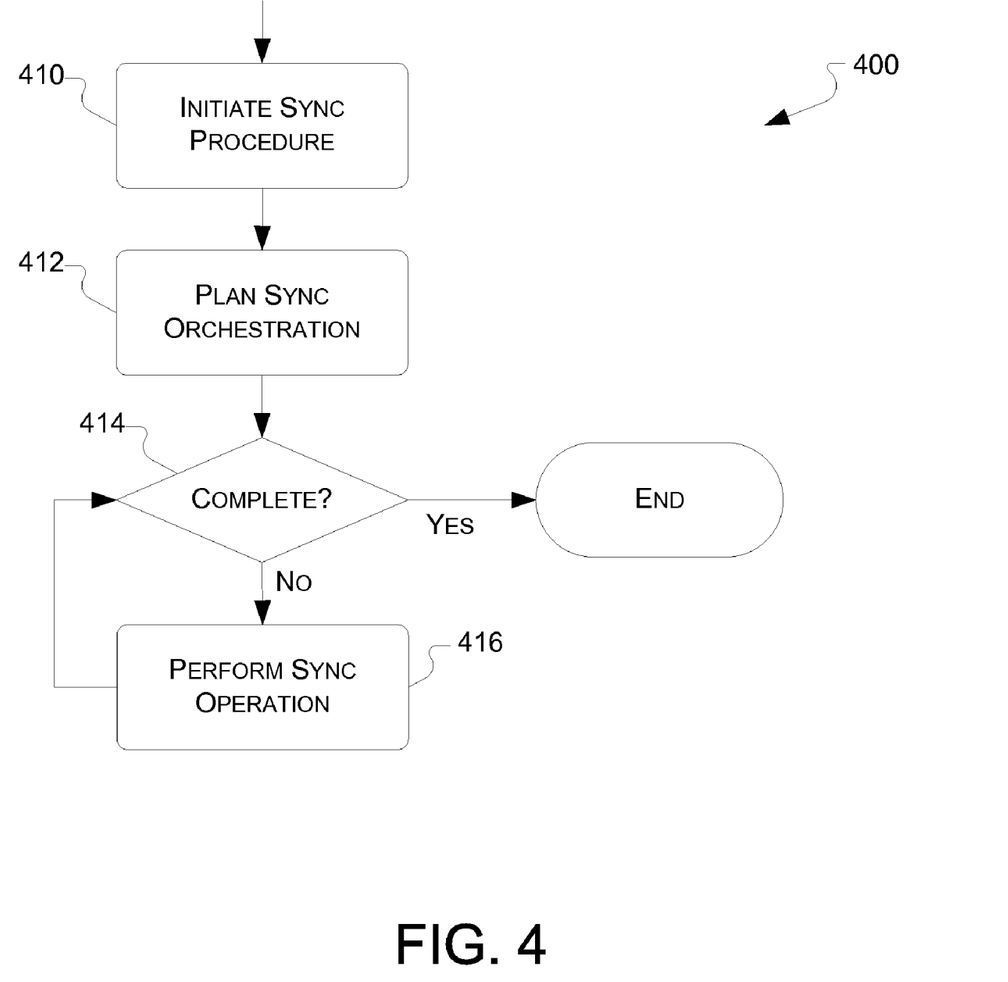
FIG. 4 illustrates one implementation of an operational flow that includes various operations that may be performed when orchestrating and synchronizing participants in a synchronization community.

Turning now to FIG. 4, shown therein is one implementation of an operational flow 400 that includes various operations that may be performed when orchestrating and synchronizing participants in a synchronization community. The following description of FIG. 4 is made with reference to FIG. 1, FIG. 2, FIG. 3, and FIG. 5. However, it should be understood that the operational flow described with respect to FIG. 4 is not intended to be limited to be used with the elements illustrated by FIG. 1, FIG. 2, FIG. 3, and FIG. 5. In addition, it should be understood that, while the exemplary operational flow of FIG. 4 indicates a particular order of execution, in one or more alternative embodiments the operations may be ordered differently. Furthermore, while the exemplary operational flow contains multiple discrete steps, it should be recognized that in some implementations some or all of these operations may be combined or executed contemporaneously.

As shown, in one implementation of the initiate sync procedure operation 410, a sync procedure is initiated. Recall that a sync procedure is different from a sync operation. A sync operation refers to a single pair-wise, or other, synchronization of data between a sync entity and a sync target, or multiple sync targets, as might be performed by a sync engine like the sync engine 230 of FIG. 2. In contrast, a sync procedure refers to a set of possibly multiple sync operations, between one (or possibly more) sync entities and one or more sync targets. The operational flow 400 is described with respect to a sync entity, like the sync entity 210 of FIG. 2. In a sync community like that illustrated with respect to FIG. 1 or FIG. 2, different sync participants may store different pieces of synchronization data and it may be desirable in some instances to synchronize between multiple different devices at various times and for the purpose of synchronizing various types and subsets of data. In a sync procedure, these multiple sync operations may be orchestrated and the sync operations performed.

A sync procedure may be initiated in many different ways. For example, a sync procedure might be initiated when a user connects a mobile phone, like the mobile phone 120 of FIG. 1, or PDA, like the PDA 130, to a desktop PC, like the desktop PC 110. As will be explained in more detail below, this connection might result in the initiation and execution of a sync procedure that synchronizes only the mobile phone or PDA with the desktop PC, or might result in the initiation and execution of a sync procedure that also involves sync operations between, for example, the desktop PC and multiple other sync targets, like a photo service such as the photo service 180 of FIG. 1, a music service such as the music service 160, and so on. Another event that might initiate a sync procedure is the passage of a defined amount of time. For example, a desktop PC that is constantly connected to a photo service via the Internet might be set to initiate a sync procedure that includes the photo service every hour. Yet another event that might initiate a sync procedure is the modification of a particular piece of data stored by a member of a sync community. For example, when a user modifies a contact, perhaps using a PDA, using a desktop PC, or using a personal information management service, like the personal information management service 140 of FIG. 1, a sync procedure involving one or more of these sync targets might be initiated.

In one implementation of the plan sync orchestration operation 412, the sync procedure initiated in operation 410 is orchestrated to more efficiently meet the needs or intent of a user, an application, or some other entity or combination of such entities. This may involve operations and calculations that ultimately identify such information as: one or more sync targets that should be synchronized as part of the sync procedure, the order in which the identified sync targets should be synchronized, and which sync operation(s) should be completed before the synchronization between the sync initiator and the sync entity can be considered complete, so that, for example, the sync initiator can be disconnected from the sync community.

The plan sync orchestration operation 412 may consider a variety of pieces of input data in determining how to orchestrate the sync procedure. For example, the plan sync orchestration operation 412 may use the types of data supported by a sync participant, such as the sync initiator, as one of the factors used to determine how the sync procedure should be orchestrated. As just one example, if the sync procedure was initiated by the connection of a media player device, that supports music and video files, to a desktop PC, the plan sync orchestration operation 412 might decide to first perform a sync operation between the desktop PC and a music service that holds music files of interest to the user, and then to perform a sync operation between the desktop PC and the connected media player. In another example, the plan sync orchestration operation 412 may decide to first synchronize the desktop PC and the media player—perhaps so the user of the media player can disconnect and go—and only then synchronize the desktop PC and the music service, and then even later possibly execute another sync operation between the now updated desktop PC and the media player, if the media player is still connected.

For additional discussion of the how operation 412 might be implemented and the input data that might be considered by an implementation of operation 412, refer to the discussion associated with FIG. 5, below.

In an implementation of operation 414, the operational flow 400 determines if the sync procedure planned as part of operation 412 has been completed. For example, operation 414 might evaluate whether all of the sync operations identified in operation 412 have been performed. In another or the same implementation of operation 414, the sync procedure might be deemed complete if all of the sync targets and sync entities involved in the sync procedure have converged—that is, they have synchronized all relevant data and possibly resolved any conflicts between the synchronized data. In yet other or the same implementations, operation 414 may include the use of a time threshold, where a sync procedure is deemed complete after some period of time has elapsed. If the sync procedure is complete, the operational flow ends. If the sync procedure is not complete, the operational flow proceeds to operation 416, described below. In a sync procedure with multiple identified sync targets or sync operations, both operation 414 and operation 416 may be executed multiple times, until all of the identified sync targets have been synchronized.

It should be noted that any evaluations performed as part of operation 414 are not limited only to information generated or associated with the plan sync orchestration operation 412. For example, the completion determination of operation 414 may be made with information that was not known at the time the sync procedure was orchestrated in operation 412. Furthermore, in some implementations, the plan sync orchestration operation 412 may be executed in various forms as part of the cycle of executing operation 414 and operation 416. For example, new input data might become available as the result of an execution of the sync target operation 416, or as a result of some event external to the operational flow 400, which may change the orchestration of the sync procedure or the determination of whether the sync procedure is complete.

Finally, in one implementation of the perform sync operation 416, one of the sync operations previously identified, for example by the plan sync orchestration operation 412, is performed. The execution of the sync operation may involve the synchronization of data to, from, or both to and from two (or in some cases more than two) sync participants. The manner in which the synchronization of data is actually accomplished may vary widely, depending on the mechanisms used to synchronize data. The set of data to transfer might, in some implementations, be identified by one or more topics, of the kind discussed previously with reference to FIG. 3, including one or more static and or dynamic topics.

In the example introduced previously, with a media player device connected to a desktop PC, one of the identified sync operations might synchronize music files between the media player and the PC. In this example with this sync operation, the music on the desktop PC might be transferred, possibly by a set of file copy operations, to the media player. No music might be transferred from the media player to the desktop PC.

In another example, perhaps when a camera has been connected to a desktop PC, or to a photo service (perhaps via a network), a sync operation might involve copying the digital files that comprise photographs from the camera to the desktop PC or photo service. No photographs might be transferred from the desktop PC or the photo service to the camera. In yet another example, a desktop PC might transfer changes in calendar data that it maintains to a personal information management service, and might also receive changes in the calendar data stored by the personal information management service. In all of these examples, various means may be used to identify the data to transfer, including static and/or dynamic topics.

Figure 5:
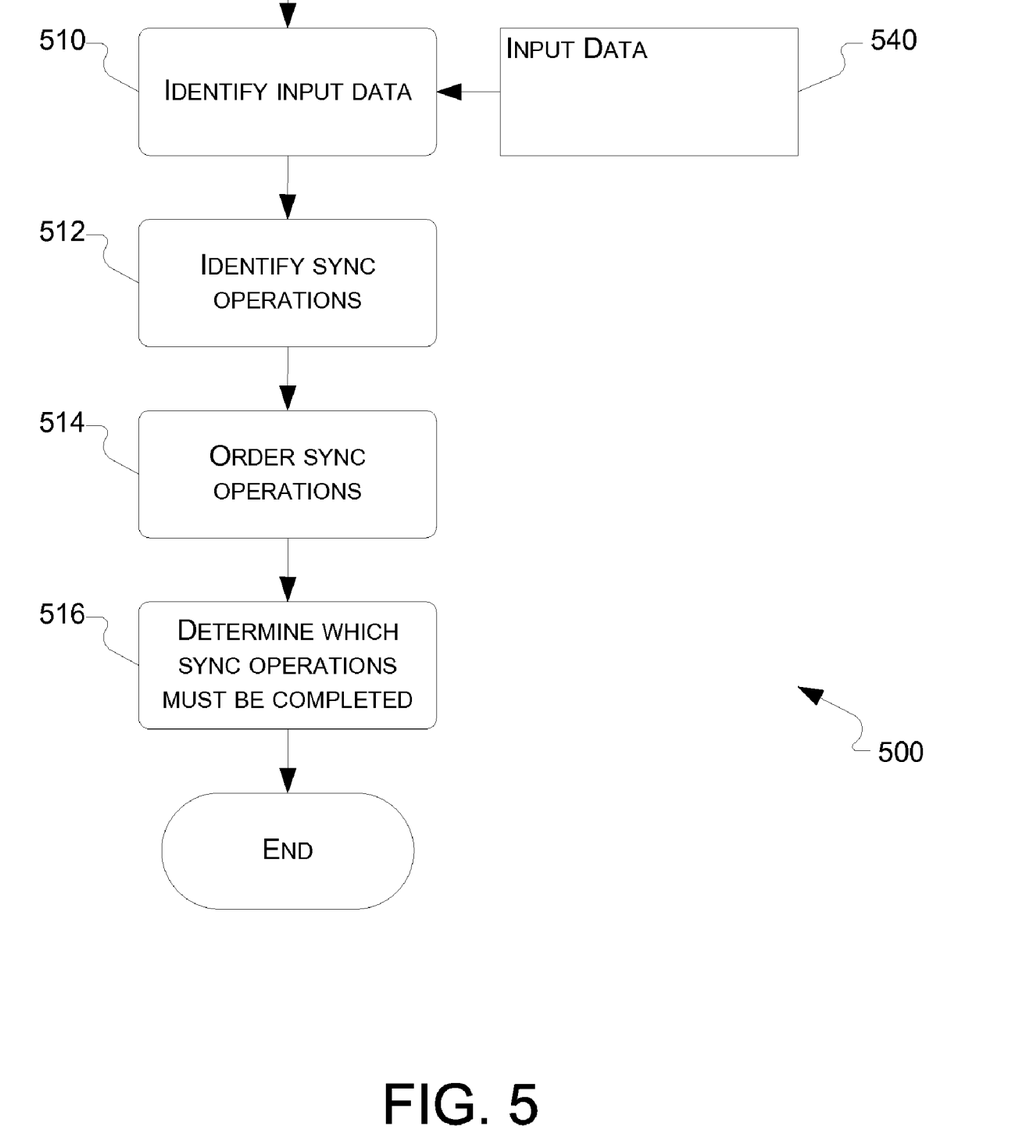
FIG. 5 illustrates one implementation of an operational flow that includes various operations that may be performed when planning the orchestration of synchronizations between synchronization participants.

Turning now to FIG. 5, shown therein is one implementation of an operational flow 500 that includes various operations that may be performed when planning the orchestration of synchronizations between sync participants, including perhaps, sync operations that are a part of a sync procedure. For example, the operations described in operational flow 500 may be used as part of the implementation of a plan sync orchestration operation 412, as described previously with reference to FIG. 4.

It should be noted that this description of FIG. 5 is made with reference to FIG. 1, FIG. 2, FIG. 3, and FIG. 4. However, it should be understood that the operational flow described with respect to FIG. 5 is not intended to be limited to be used with the elements illustrated by FIG. 1, FIG. 2, FIG. 3, and FIG. 4. In addition, while the exemplary operational flow of FIG. 5 indicates a particular order of execution, in one or more alternative embodiments the operations may be ordered differently. Furthermore, while the exemplary operational flow contains multiple discrete steps, it should be recognized that in some implementations some or all of these operations may be combined or executed contemporaneously. Finally, the steps illustrated in operational flow 500 are directed toward planning the orchestration of a sync procedure. Not all steps or decisions made during such planning may be listed as operations in operational flow 500, and any step that aids in planning of the sync procedure may be considered as part of the operational flow 500.

In one implementation of operation 510, input data 540 is identified and/or gathered. This input data 540 may then be used in other steps of the operational flow 500 to determine how to orchestrate the sync procedure. The input data identified in this step is wide-ranging and may include, but is not limited to, the data discussed in the following paragraphs, and the like.

One kind of input data may be the type or types of synchronization data—like calendar information, contacts, music files, and so on—stored by the sync initiator, and the type or types of synchronization data stored by the sync entity or sync targets. For example, a media player that stores music and video files may be connected and the fact that the media player stores music and video files may be used as part of the input data to determine how to best orchestrate the sync procedure.

Another kind of input data may be the typical or common uses of a connected device, including the sync initiator. That is, this kind of input data might consider the purpose or purposes of the connected device. For example, a digital camera typically generates digital image files which it may want to transfer to sync targets. The same camera does not typically act as, say, a media player or a device for managing information like contacts, and so may not need to receive any changes from other sync participants. In addition, it may be possible to infer the type of synchronization data relevant to a device by its common use. This may be useful, for example, in the case where the types of data stored by the device may not themselves be explicitly identified. For example, the knowledge that a device is a camera, obtained using a USB identifier, for example, may imply that digital image files are a type of relevant synchronization data, independent of whether the device has expressed any interest in digital image files.

Yet another type of input data may be various characteristics of particularly relevant sync participants, especially the sync initiator. For example, the sync procedure might be orchestrated differently depending on whether the sync procedure was initiated by the connection of a particular sync participant—like a mobile phone, PDA, or media player—or was initiated because a set amount of time had elapsed, and so on.

Yet another kind of input data may be the nature of the connections between the sync entity and one or more sync targets, including the nature of the connection between the sync initiator and the sync entity on which sync orchestration is being performed. A connection may be considered using a "quality measure value," which measures a characteristic of a communication link. Some example quality measure values may include the measured bandwidth of a communication link, the theoretical maximum bandwidth of a communication link, the latency of a communication link, and so on. For example, some connections—like a wired USB or Ethernet LAN connection—may have low latency and high bandwidth, while other connections may have high latency and/or low bandwidth. In addition to the latency and bandwidth of a connection, it may also be useful to know or infer some knowledge of how often the connection itself is available. For example, some participants in a sync community may be connected for most or all of the time. This category of participants might include services located on the Internet. Another set of participants—like mobile phones and PDAs—might only be connected relatively infrequently.

Yet another kind of input data may be the type of synchronization that is supported by one or more sync participants. For example, some participants might themselves be sync entities, and contain, for example, their own sync engine and possibly orchestration manager and so on. Other participants might store data and understand how to interact with a sync entity, but not have the ability to perform a sync operation themselves, perhaps because they do not have their own sync engine, for example. Yet other participants might simply store data and have no knowledge or ability to perform any kind of synchronization or even to assist in synchronization, except to provide data. One example of these types of sync participants is described in U.S. patent application Ser. No. 11/354,677, filed Feb. 15, 2006, where the first kind of participant is termed a "full participant," the second type of participant is called a "partial participant," and the third type of participant is called a "simple participant".

Yet another kind of input data may be information about the topology of the synchronization community, including how sync participants are connected to each other and which sync participants are connected to which other sync participants. In some implementations, topology information like this may be provided by a module such as the topology manager 255 described previously with respect to FIG. 2.

Yet another type of input data may be any explicit user-specified action or intent. For example, a user might have the ability to instruct or direct the synchronization procedure or operation(s), perhaps by setting options in a user interface, by modifying configuration files, by selecting particular types or sets of synchronization data, and so on.

In one implementation of operation 512, the sync operations needed to efficiently execute the sync procedure may be identified. This operation may be completed in a wide variety of ways, using the input data gathered in operation 510. Regardless of how this operation is performed, the operation 512 identifies the sync operations which can be used to orchestrate the sync procedure to match or fulfill the intent of a user or other entity.

For example, in one implementation of the operation 512, it may be determined that a sync operation should be performed between the sync initiator and the sync entity with which the sync initiator has been connected. This might be the case, for example, if a mobile phone, PDA, or media player device has been connected to a desktop PC.

In the same other implementations of operation 512, it may be determined that sync operations should be performed with sync targets that support one or more of the types of data identified as being important in the sync procedure, where the importance may be determined by, for example, the data type(s) stored by the sync initiator, the data type(s) of other sync targets, and the data type(s) explicitly identified by the user.

Further, in the same or other implementations of operation 512, sync operations may be scheduled with sync targets that are currently connected, or with sync targets that have connections that may support transferring the synchronization data. For example, if a particular sync target is only interested in large video files and the only currently available connection to that sync target is a low bandwidth connection, that sync target may not be included in this particular iteration of the sync procedure. In such an example, the bandwidth quality measure value may be below some threshold established for transferring large files. In the same or other implementations, the presence of particular sync targets—such as targets that are only connected to the sync community infrequently—may result in a sync operation with the infrequently-connected sync target, even if the communications link isn't of a high quality. In such a situation, some implementations may adjust the amount or quality of synchronized data transferred to the sync target. For example, rather than sending entire email messages, only the headers of the email messages may be transferred. Or, when media files are transferred, they may be automatically transcoded so that they consume less storage space. This may be accomplished, for example, by using more aggressive compression or a different type of compression/decompression scheme.

In one implementation of operation 514, the sync operations in the sync procedure, such as those possibly identified in operation 512, may be ordered to efficiently implement the sync procedure. Again, this operation may be performed in a variety of ways, to fulfill the intent of a user, by using the input data gathered in operation 510.

For example, as may be the case with a mobile phone, PDA, or media player, a sync operation between the sync entity and the sync initiator may be identified to be performed first, before any other sync operations, so that the user of the sync initiator can quickly disconnect the initiating device. This sync operation may be performed first even if the synchronization data on the sync entity—i.e., on the desktop PC in this example—is not up-to-date. In the same or other implementations, multiple sync operations may be performed in a round-robin fashion, or may be specifically ordered so that certain types of data are synchronized before other types of data.

In an implementation of operation 516, the operational flow 500 may determine which, if any, sync operations must finish so that the sync procedure can be considered "complete," again, to fulfill the intent of a user.

For example, in a sync community with many different sync participants, perhaps similar to the exemplary sync community described previously with reference to FIG. 1, a full synchronization may consist of a large number of sync operations, perhaps including sync operations with all of the participants in the community. Further, the large number of operations may consume a similarly large amount of time. In such a situation, the user of a portable device, again like a mobile phone, may not want to wait until all of the sync operations have been completed before disconnecting the device. To meet this need of the user, in operation 516 it may be determined that only the sync operation that involves the portable device should be completed before it can be indicated to the user that the portable device may be removed. The remaining identified sync operations, if any, may still be performed after any such identified sync operations have completed, devices removed, and so on. Note that in this context, a sync operation might be considered complete even if the sync operation encountered an error—that is, the sync operation may be considered complete regardless of whether it completed successfully.

Example Computing Environment

Figure 6:
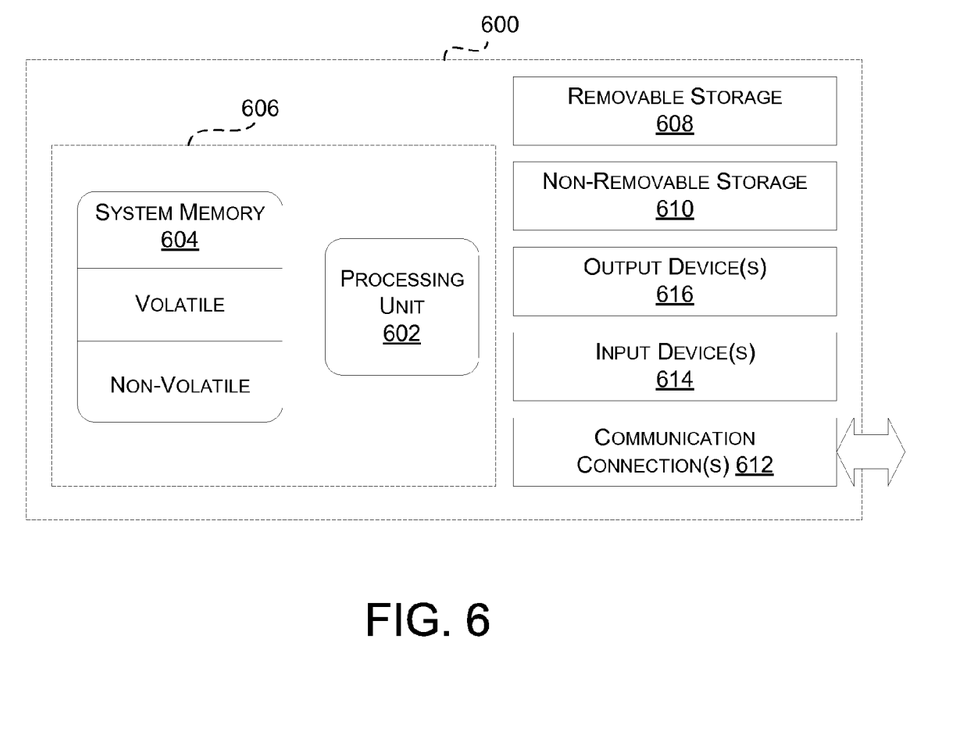
FIG. 6 illustrates an exemplary computer device in which the various technologies described herein may be implemented.

Turning now to FIG. 6, this figure and the related discussion are intended to provide a brief, general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 600 illustrated in FIG. 6.

Generally, program modules include routines, programs, objects, components, data structures, etc., that perform particular tasks or implement particular abstract data types. Tasks performed by the program modules have been described previously with the aid of one or more block diagrams and operational flowcharts.

Those skilled in the art can implement the description, block diagrams, and flowcharts in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 600 illustrated in FIG. 6, in its most basic configuration, includes at least one processing unit 602 and memory 604. Depending on the exact configuration and type of computing device, the memory 604 may be volatile (such as RAM), non-volatile (such as ROM, flash memory, etc.), or some combination of the two. This most basic configuration is illustrated in FIG. 6 by dashed line 606. Additionally, the computing device 600 may also have additional features and functionality. For example, the computing device 600 may also include additional storage (removable and/or non-removable) including, but not limited to, magnetic or optical disks or tape. Such additional storage is illustrated in FIG. 6 by the removable storage 608 and the non-removable storage 610.

The computing device 600 may also contain one or more communications connection(s) 612 that allow the computing device 600 to communicate with other devices. The computing device 600 may also have one or more input device(s) 614 such as keyboard, mouse, pen, voice input device, touch input device, image input device (like a camera or scanner), etc. One or more output device(s) 616 such as a display, speakers, printer, etc. may also be included in the computing device 600.

Those skilled in the art will appreciate that the technologies described herein may be practiced with computing devices other than the computing device 600 illustrated in FIG. 6. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 6, or may be described differently.

The technologies described herein may also be implemented in distributed computing environments where tasks are performed by remote processing devices that are linked through a communications network. In a distributed computing environment, program modules may be located in both local and remote memory storage devices.

While described herein as being implemented in software, it will further be appreciated that the technologies described herein may alternatively be implemented all or in part as hardware, firmware, or various combinations of software, hardware, and/or firmware.

Although some particular implementations of systems and methods have been illustrated in the accompanying drawings and described in the foregoing text, it will be understood that the systems and methods shown and described are not limited to the particular implementations described, but are capable of numerous rearrangements, modifications and substitutions without departing from the spirit set forth and defined by the following claims.

What is claimed is:

1. A method for synchronizing data according to a synchronization procedure performed between a sync initiator and two or more synchronization targets that are connected by at least one communication link, comprising:
   receiving input data comprising:
      user input that specifies that a synchronization procedure is to be initiated, and
      a quality measure value associated with the at least one communication link, the quality measure value comprising at least a measured bandwidth of the at least one communication link;
   performing the synchronization procedure, the synchronization procedure comprising a plurality of synchronization operations and involving a sync initiator and two or more synchronization targets that are connected by at least one communication link, the synchronization operations comprising:
      synchronizing first set of synchronization data on a first synchronization target from the sync initiator, and synchronizing a second set of synchronization data on a second synchronization target to the sync initiator, wherein the first set depends on the second set, planning an orchestration of the synchronization procedure to match the determined user's intent, the planning comprising:

determining that the user input includes an indication that the user desires a quick synchronization, and based upon the determination that the indication indicates that the user desires a quick synchronization, ordering the plurality of synchronization operations to perform a quick synchronization, wherein the quick synchronization comprises abstaining from synchronizing the second set of synchronization data from the second synchronization target to the sync initiator; and orchestrating the synchronization procedure, the orchestrating comprising:

selecting, based on the ordering of the plurality of synchronization operations, the first set of synchronization data to be transferred between the sync initiator and the first synchronization target without first synchronizing the second set of synchronization data from the second synchronization target to the sync initiator abstaining from synchronizing the sync initiator with the second synchronization target until after synchronizing the sync initiator with the first synchronization target, the abstaining is performed based on the determination that the indication indicates that the user desires a quick synchronization and even upon the condition that the second synchronization target is currently available to synchronize the second set of synchronization data, a first data transfer, wherein the first data transfer comprises:

determination that the quality measure value exceeds a specified threshold, transferring the first set of synchronization data from the sync initiator to the first synchronization target, upon the determination that the quality measure value is below a specified threshold, adjusting the quality of the synchronized data being transferred to the first sync target, the first data transfer being performed without first synchronizing the second set of synchronization data from the second synchronization target to the sync initiator such that the first set of synchronization data does not include updates that have been made to the second set of synchronization data on which it depends, and a second data transfer, wherein the second data transfer comprises:

determination that the quality measure value exceeds a specified threshold, transferring the second set of synchronization data from the second synchronization target to the sync initiator upon the determination that the first data transfer has been completed and the first synchronization target is no longer connected to the sync initiator, and upon the determination that the quality measure value is below a specified threshold, adjusting the quality of the synchronized data being transferred to the second sync target.

2. The method of claim 1 wherein:

the sync initiator stores at least a portion of the synchronization data;

the input data further comprises information about the synchronization data stored by the sync initiator; and the two or more synchronization targets involved in the transferring operation also store at least a portion of the synchronization data stored by the sync initiator.

3. The method of claim 1 wherein the synchronization procedure is initiated by at least one of:

connection of the sync initiator;

passage of a set period of time; and modification of at least a portion of the synchronization data.

4. The method of claim 1 wherein the synchronization data is defined by at least one of:

a static synchronization topic; and a dynamic synchronization topic.

5. The method of claim 1 wherein the input data further comprises whether the sync initiator is a full participant, a partial participant, or a simple participant.

6. The method of claim 1' wherein the input data further comprises instructions explicitly provided by the user.

7. The method of claim 1 wherein at least one of the two or more synchronization targets is also a second synchronizing initiator that synchronizes with one or more additional synchronization targets with which the synch initiator is not directly connected and with which the sync initiator cannot synchronize directly.

8. The method of claim 1 wherein the sync initiator has one or more common uses and the input data further comprises one of the one or more common uses of the sync initiator.

9. The method of claim 1 wherein the input data further comprises topology information about a synchronization community that includes the synchronizing initiator and the two or more synchronization targets.

10. The method of claim 1 wherein the first synchronization target is a portable music player, the synchronization initiator is a personal computer, and the second synchronization target is an online music service.

11. One or more computer storage media that store computer executable instructions which when executed by one or more processors perform the method of claim 1.

12. The method of claim 1 wherein the quality measure value further comprises at least one of:

a theoretical maximum bandwidth of the at least one communication link; and a latency of the at least one communication link.

* * * * *